United States Patent [19]
James

[11] Patent Number: 4,457,316
[45] Date of Patent: Jul. 3, 1984

[54] AXIAL FLOW COMBINE WITH SINGLE DISTRIBUTION AUGER

[75] Inventor: Larry R. James, Olathe, Kans.

[73] Assignee: Allis-Chalmers Corp., Milwaukee, Wis.

[21] Appl. No.: 460,580

[22] Filed: Jan. 24, 1983

Related U.S. Application Data

[63] Continuation-in-part of Ser. No. 283,975, July 16, 1981, Pat. No. 4,369,617.

[51] Int. Cl.³ .......................... A01F 7/00; A01F 12/18
[52] U.S. Cl. .................................. 130/27 Q; 130/27 T
[58] Field of Search .................. 130/27 J, 27 T, 27 Q, 130/27.2; 56/14.6

[56] References Cited

U.S. PATENT DOCUMENTS

| 3,797,502 | 3/1974 | Reed et al. ........................... 130/27.2 |
| 4,103,691 | 8/1978 | Shaver .............................. 130/27 Q |
| 4,108,150 | 8/1978 | Shaver .............................. 130/27 T |
| 4,180,081 | 12/1979 | Shaver .............................. 130/27 Q |
| 4,369,617 | 1/1983 | Hanaway et al. ..................... 56/14.6 |

FOREIGN PATENT DOCUMENTS

| 683727 | 4/1964 | Canada ............................. 130/27 Q |
| 2101491 | 3/1972 | France ............................. 130/27 J |
| 604936 | 5/1960 | Italy ................................ 130/27 Q |
| 7701151 | 8/1978 | Netherlands ....................... 130/27 Q |

Primary Examiner—Paul J. Hirsch
Attorney, Agent, or Firm—Charles L. Schwab

[57] ABSTRACT

An axial flow combine (11) includes a processor (13) at an elevated position in a housing (63) providing adequate space between the cage (34) and the front and rear housing walls (64, 66, 62, 67, 68) and to permit steep incline of wall portions 62, 67, 68 to insure gravity movement of threshed material exiting the case (34) to a single distribution auger (37) and to a slot (69) feeding a pair of vertically offset accelerator rolls (41, 42). The beforementioned features and a smooth exterior of the processor cage (34) permit elimination of a cage sweep mechanism previously employed in similar combines.

4 Claims, 8 Drawing Figures

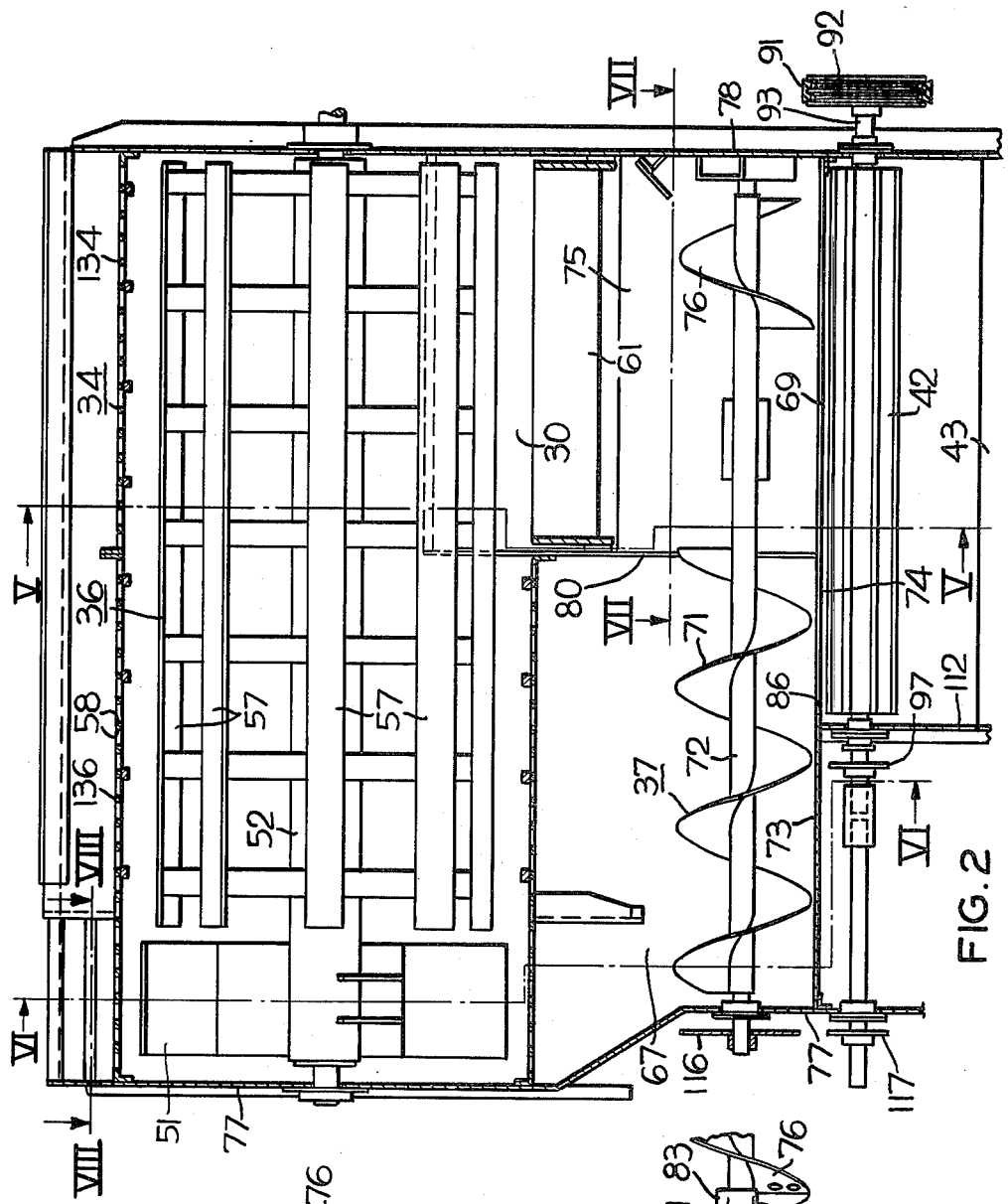
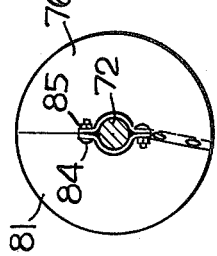
FIG.4
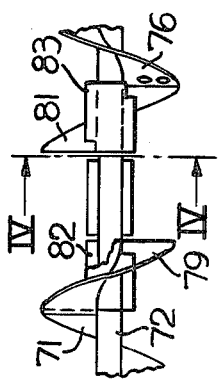
FIG.3
FIG.2

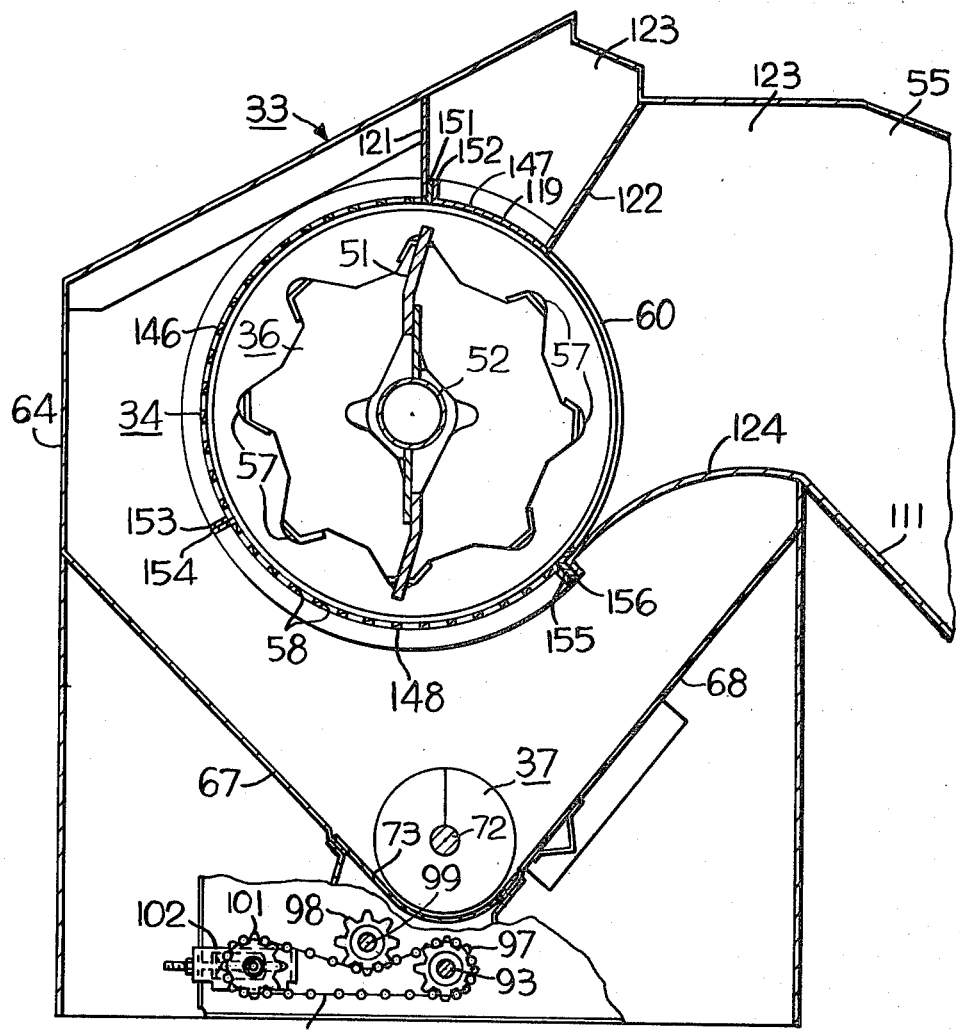
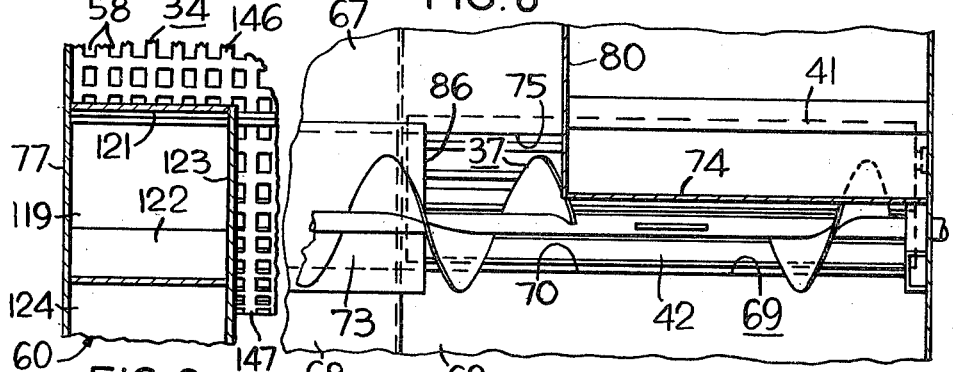
FIG. 6
FIG. 8    FIG. 7

AXIAL FLOW COMBINE WITH SINGLE DISTRIBUTION AUGER

RELATED APPLICATIONS

This application is a continuation-in-part of copending U.S. patent application Ser. No. 283,975 filed July 16, 1981 entitled "Feeder Idler Drum Shaft with Removable Extensions" issued Jan. 25, 1983 as U.S. Pat. No. 4,369,617.

BACKGROUND OF THE INVENTION

1. Technical Field

This invention relates to an agricultural harvester and, more particularly, to an axial flow combine having a threshing section in overlying relation to a cleaning section.

2. Prior Art

Combines are currently being marketed using a processor having a foraminous cylindrical cage in which a rotor is coaxially disposed. The processor or cleaning section of such prior art combine is disposed within a housing disposed above a cleaning section and has an overhanging part which extends beyond one lateral side of the cleaning section. In order to move threshed material from the bottom of the overhanging part of the processor housing to a slot above a pair of accelerated rolls, such prior are combine uses two distribution augers on parallel axes spaced from one another in the longitudinal direction of the combine. Such a prior art combine is shown in U.S. Pat. No. 4,180,081 issued Dec. 25, 1979 to J. Lyle Shaver for Distribution Augers for an Axial Flow Combine.

In the prior art combine shown in U.S. Pat. No. 4,337,781 issued July 6, 1982 to Charles F. Brundage for Roller Support for Cage Sweep Mechanism, the foraminous cage and rotor are enclosed in a housing with front and rear walls relatively close to the cage. Also, axially extending reinforcing ribs are used on the outer side of the cage which tended to catch the threshed material passing through the radial openings in the upper part of the cage preventing it from sliding down the outside of the cage to the pair of distribution augers below the cage. In order to move the threshed material from the exterior top and sides of the cage, a cage sweep with curved fingers is used as shown in the beforementioned U.S. Pat. No. 4,337,781.

BRIEF DESCRIPTION AND OBJECTS OF THE INVENTION

The present invention is advantageously used in an axial flow combine having a header at its front end, a processor including a cylindrical foraminous cage and a rotor within and coaxial to the cage and a feeder conveyor for conveying harvested crop material from the header upwardly and rearwardly to the processor. The housing for the processor includes front, rear, right and left sidewalls with the right and left sidewalls rotatably supporting the rotor on a horizontal transverse axis. The cage is also supported by the sidewalls of the housing and has a first radial opening or entrance adjacent one of its axially opposite ends for receiving crop material from the feeder conveyor and has a second radial opening at its other axial end serving as an exit for crop material from which the grain has been removed by the processor. A concave is installed in the cage at the first radial opening. The combine of this invention includes a cleaning section having a first lateral sidewall substantially aligned with the sidewall of the processor housing adjacent the first radial opening and a second lateral sidewall spaced laterally inward from the housing sidewall at the second radial opening whereby the cleaning section is of less lateral width than the processor housing and the latter has an overhanging part extending laterally beyond the cleaning section. The front and rear sidewalls have sloping portions in the overhanging part of the housing which converge downwardly to an auger trough. The sloping portion of the rear wall behind and below the concave slopes downwardly and forwardly terminating at an edge defining the rear edge of a vertical discharge opening or slot in the bottom of the processor housing extending substantially across the width of the cleaning section. A pair of front and rear accelerator rolls extend laterally across the width of the cleaning section in a position to receive threshed material falling through the discharge slot. The processor housing includes an upright wall extending downwardly beneath the concave to the front of the front accelerator roll thus forming at least a part of a front edge of the discharge slot.

An important feature of the invention is the use of a single distribution auger at the bottom of the processor housing which has opposite ends rotatably supported on the left and right sidewalls on a horizontal transverse axis. The auger includes a first spiral flight in cooperative relation to the trough and operative upon rotation in a predetermined direction to move threshed material passing through the radial openings of the cage laterally from the overhanging part of the housing to the discharge slot.

The auger may include a second, oppositely pitched flight near its other end operable to move threshed material laterally inward as it falls through the slot.

The cage preferably has relatively smooth surfaces on its top, front and rear exterior sides to minimize resistance to the sliding and falling of threshed material passing through radial openings in the upper part of the cage. Also the front and rear sidewalls are spaced a sufficient distance from the foraminous cage to not interfer with the gravity movement of threshed material to the bottom of the processor housing. This construction permits elimination of the cage sweep mechanism of prior art combines.

The processor occupies an elevated position on the combine to provide adequate space between the cage and the downward converging portions of the front and rear sideways and to permit such portion to extend in substantially tangential relation to a single distribution auger.

It is an object of this invention to provide an axial flow combine having a single distribution auger.

It is a further object of this invention to provide an axial flow combine having a cylindrical cage with radial openings in its sides and top wherein a cage sweep mechanism need not be used.

It is a further object of this invention to provide flighting on a single distribution auger operable to move threshed material to the laterally central part of a discharge slot above accelerator rolls so that material is relatively evenly distributed across the lateral width of the cleaning section even when the combine is harvesting a side slope.

BRIEF DESCRIPTION OF THE DRAWINGS

One embodiment of the invention is shown in the drawings in which:

FIG. 2 is a transverse vertical section through the combine along the line II—II in FIG. 1;

FIG. 3 is a partial view of a distribution auger showing addition of removable flight sections;

FIG. 4 is a view taken along the line IV—IV in FIG. 3;

FIG. 6 is a view taken along the line VI—VI in FIG. 2;

FIG. 7 is a view taken along the line VII—VII in FIG. 2; and

FIG. 8 is a view taken along the line VIII—VIII in FIG. 2.

DETAILED DESCRIPTION OF THE DRAWINGS

Figure 1:
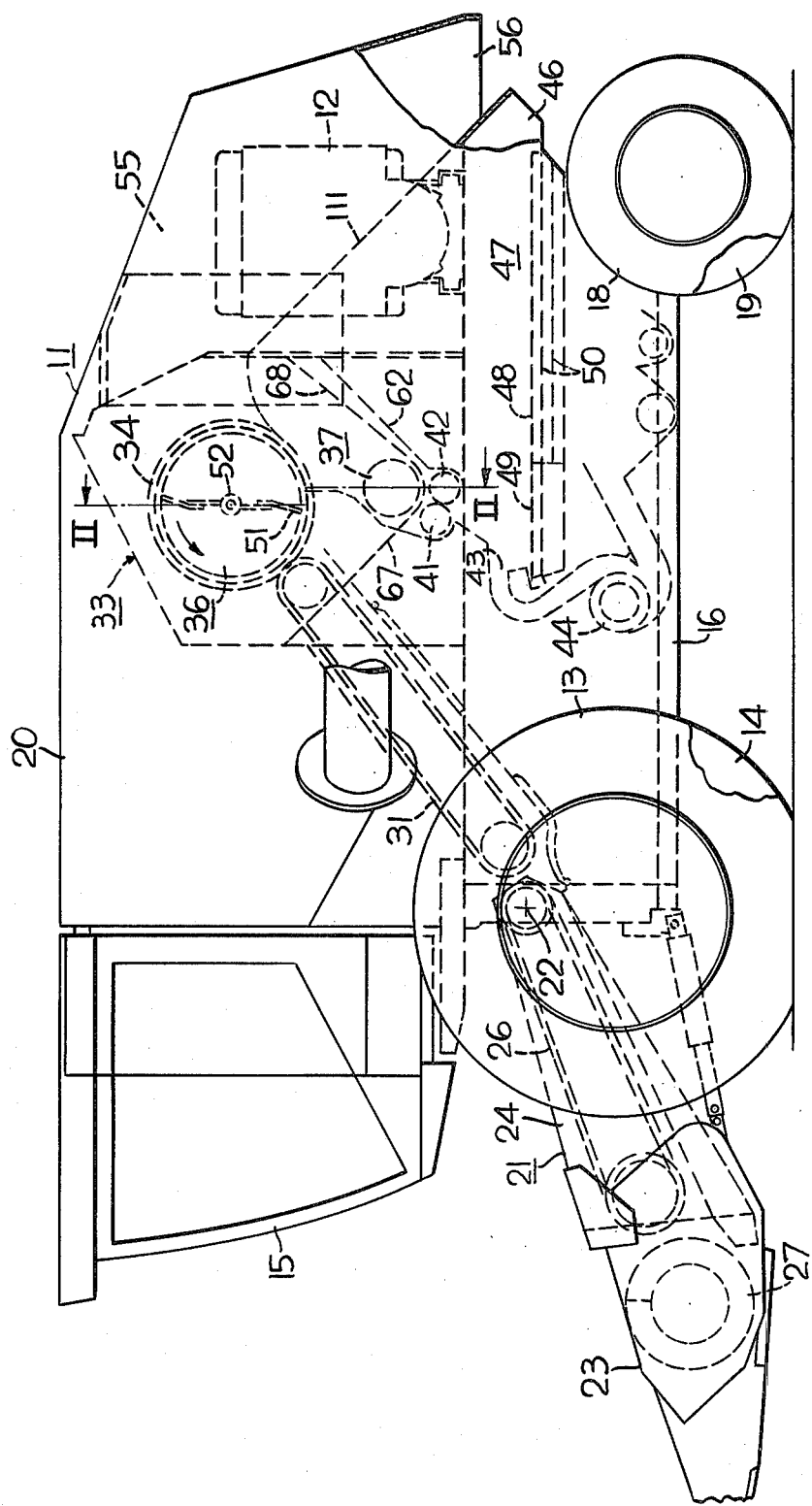
FIG. 1 is a left-hand side view of a combine.

Referring to FIGS. 1 and 2, an agricultural harvester in the form of a combine 11 is powered by an internal combustion engine 12 mounted on a main frame 16 and connected by a drive train (not shown) to a pair of front drive wheels 13, 14. The main frame 16 of the combine supports an operator's cab 15 and a grain bin 20 and the rear end of the frame 16 is supported by a pair of steerable wheels 18, 19. A header assembly 21 at the front of the combine has its rear end pivotally connected on a transverse horizontal axis 22 to the main frame 16 and includes a header 23 and a conveyor housing 24 in which a coneyor 26 is disposed. Crop material cut by the header mechanism 23 is moved laterally inward by a transverse auger 27 to a central position where it is conveyed rearwardly by the conveyor 26 to the front end of a second conveyor 31 which in turn conveys the material rearwardly to a processor or threshing section 33 to the combine 11. The crop material conveyed rearwardly by the conveyor 31 enters a radial crop receiving opening or entrance 30 in a cylindrical, foraminous cage 34 where it is threshed by a rotor 36 rotatably supported on left and right sidewalls 77, 78. The rotor 36 rotates counterclockwise, as viewed in FIG. 1, and is coaxial to the cage 34. Threshed material passing through the radial openings 58 of the foraminous cage and openings in an underlying concave 61 falls downwardly to a distribution auger 37 which moves the material laterally inward to a transversely extending vertical discharge opening or slot 69 above a pair of equal diameter accelerator rolls 41, 42. The accelerator rolls 41, 42, which have overlapping lugs which mesh without touching, accelerate the threshed material downwardly across an air stream delivered rearwardly from an air outlet 43 by a transverse fan 44. The air discharged from the outlet 43 blows the chaff and small stalk particles rearwardly where they are discharged through an opening 46 at the rear of the cleaning section 47. The cleaning section 47 includes a shaker assembly 48 having a grain pan 49 at its front end and screens 50 at the rear of the grain pan.

Straw and coarse material which does not pass through the concave or the radial openings 58 in the cage 34 is thrown rearwardly into a chute 55 from the threshing section 33 by way of a radial outlet or opening in the cage 34 by a paddle assembly 51 on the left-hand end of the rotor shaft 52. The material thrown rearwardly by the paddle assembly 51 through the cage outlet passes through the discharge chute 55 and discharges through a downwardly open discharge opening 56.

Figure 5:
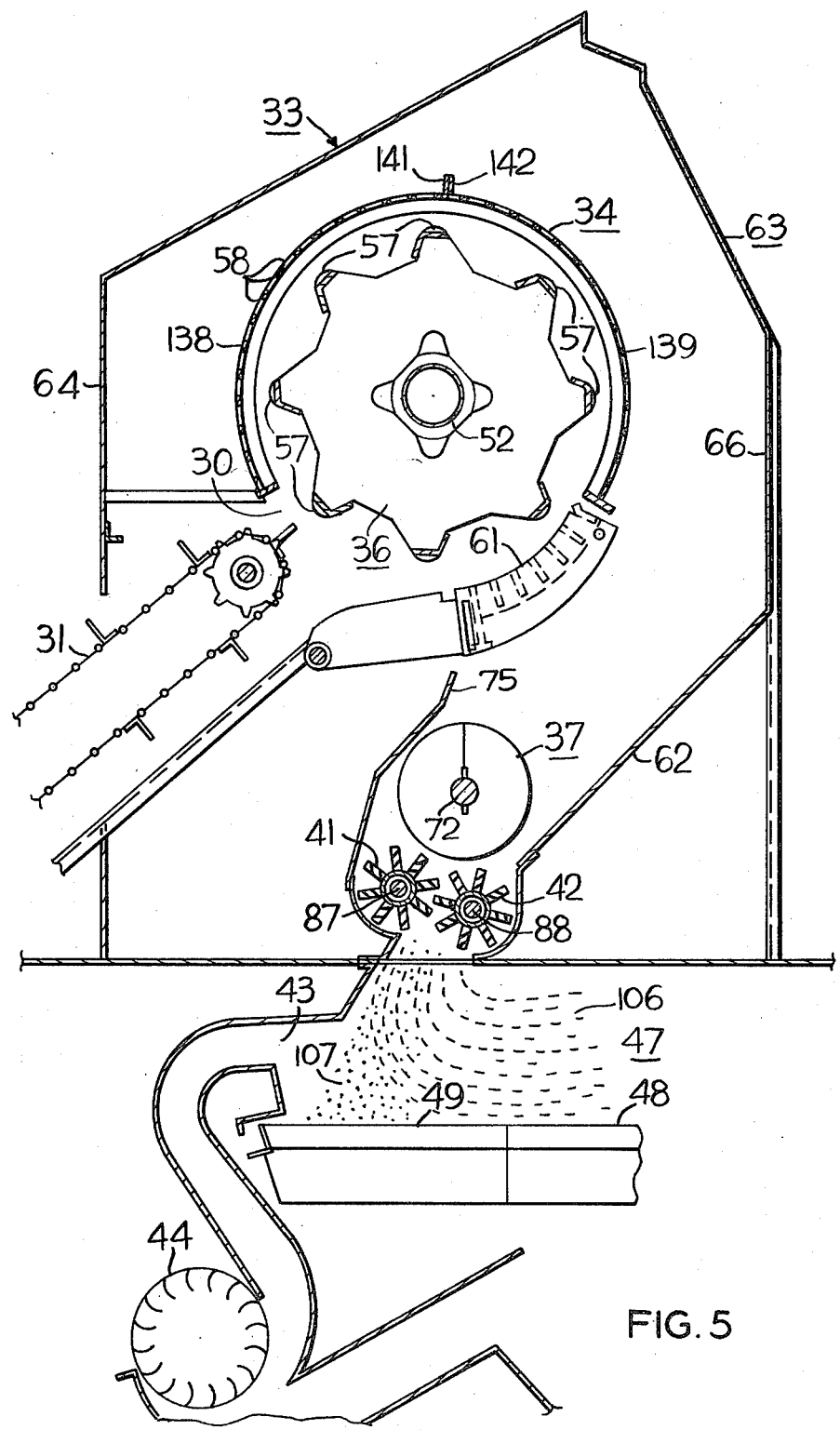
FIG. 5 is a view taken along the line V—V in FIG. 2.

Referring also to FIGS. 3 through 8, the crop material delivered by the upper conveyor 31 to the foraminous cage 34 is impacted by the rasp bars 57 of the rotor 36 thereby causing grain to be separated from the crop material which then passes through openings in the concave 61 and through the radial openings 58 of the cage 34. As seen in FIG. 5, the threshed material passing radially from the cage 34 and concave 61 at the rear of and below the concave area falls downwardly to a sloping wall portion 62 of the processor housing 63 in which the cage 36 is positioned. It will be noted that the rotor 36 and cage 34 of the processor 33 are positioned at an elevated position on the combine a generous amount of fore and aft distance is provided between the front wall 66 of the housing 63 and the cage 34 and between the rear wall 66 of the housing 63 and the cage 34. The elevated position of the cage in relation to the accelerator rolls, 41, 42 permits the downwardly converging portions 67, 68 and 62 of the front and rear walls 64, 66 to be pitched at a relatively steep angle and still be substantially tangential to the single distribution auger 37. For instance, wall portions 67 and 62 are each pitched at a 45° angle to the horizon and wall portion 68 is pitched at 51° to the horizon. The ample spacing between the cylindrical cage 34 and the walls 64 and 66 and the steep pitch of the wall portions 62, 67, 68 insure gravity movement of the threshed material exiting radially from the processor 33 to the single horizontal, transverse distribution auger 37 or, in the case of the wall 62, to the vertical opening or slot 69 above the accelerator rolls 41, 42. As will be noted in FIG. 7, the lower edge 70 of the wall portion 62 forms the rear edge of the vertically open slot 69. The front edge of the slot 69 is defined by an upright wall 75 extending downwardly from the concave to the front of the front accelerator roll 41 and by a lower horizontal end 74 of wall portion 67 extending laterally between a longitudinal vertical wall 80 and the laterally inner edge 86 of the trough 73. The slot 69 extends laterally between the edge 86 and the right sidewall 78. The elevated height of the processor 33 also contributes to the desirable steep downward incline of the bottom wall 111 of the discharge chute 55.

The upward offsetting of the accelerator roll 41 relative to the rear accelerator roll 42 permits the shaker assembly 48 to be moved forwardly thus permitting the combine to be shortened and also permitting the discharge chute 55 to be shortened. The shortening of the discharge chute 55 contributes to the steep incline of the bottom wall 111. The wall 111 is sufficiently steep to cause crop material falling thereon to slide by gravity to the downwardly open discharge opening 56. Thus the steep bottom wall 111 of the discharge chute obviates the need for auxiliary energy discharging devices such as an impeller or other apparatus to impart additional impetus to crop material discharged by the paddle assembly 51 through the discharge opening or exit 60 of the cage adjacent the left sidewall 77. The cage 34 consits of a threshing segment 134 and a separating segment 136. As shown in FIG. 5, the threshing segment 134 includes front and rear parts 138, 139 extending circumferentially about 120° from the top of the cage where confronting transversely extending flanges 141, 142 of the parts 138, 139 are releasably secured to one another by bolts and nuts, not shown. As shown in FIGS. 6 and 8, the separating segment 136 consists of three parts 146, 147, 148 having radially outward and transversely extending flanges 151, 152, 153, 154, 155, 156 at their circumferentially confronting ends which are secured by suitable fastening means, not shown. The flanges 141, 142, 151, 152 of the top of the cage segments do not interfer with the gravity flow of threshed material leaving the cage via the radial openings 58. The flanges 153, 154, 155, 156 are sufficiently low at the front and rear of the cage so as to not offer any substantial resistance to the gravity movement of the threshed material leaving the cage 34 by way of the radial openings 58. The smooth, virtually unobstructed periphery of the cage 34 facilitates gravity flow of threshed material off the top and sides of the cage exterior without the need of a cage sweep or similar mechanism to disturb threshed material deposited there.

The distribution auger 37 has a first flight 71 secured as by welding to the distribution auger shaft 72 which is pitched in a first direction so that upon counterclockwise rotation of the shaft 72, as viewed in FIGS. 5 and 6, it will move threshed material in the auger trough 73 from left to right as viewed in FIGS. 2 and 7. The distribution auger 37 also includes a flight 76 adjacent the right sidewall 78 which is pitched in the opposite direction to the pitch of flight 71 so as to move threshed material falling from the processor 33 from right to left, as viewed in FIGS. 2 and 7, when it is rotated in a counterclockwise direction as viewed in FIGS. 5 and 6. The ends of the auger shaft 72 are rotatably supported by the laterally opposite upstanding sidewalls 77, 78 of the combine. In some crop of harvesting conditions, it may be desirable to add flight segments 79, 81 to the distribution auger as shown in FIGS. 3 and 4. The flight segments 79, 81 are releasably secured to the shaft by clamping brackets 82, 83 bolted to the segments 79, 81 by bolts 84 and nuts 85. The flighting on the rotating distribution auger 37 effects a desired positioning or distribution of the threshed material to the slot 69 so that the side-by-side accelerator rolls 41, 42 will distribute a band of threshed material to the cleaning section 47. More specifically, the flight 71 extends laterally beyond the trough edge 86 over the left hand part of the slot 60 and serves to distribute threshed material to the laterally central part of the slot. In a similar manner, flight 76 operates to distribute threshed material laterally inward from the right-hand end of the housing to a laterally central part of the slot 69. This laterally inward movement contributes to good distribution of threshed material to the accelerator rolls 41, 42 and to the cleaning section 47, and help maintain good distribution even when the combine is operating on a side slope.

The accelerator rolls 41, 42 have axes 87, 88 which are generally horizontal and parallel to one another. The front accelerator roll 41 is offset above the rear accelerator roll 42, that is, the axis 87 of accelerator roll 41 is vertically offset above the axis 88 of the rear accelerator roll 42. The accelerator roll 42 is driven through a power train from the engine 12 which includes a V-belt 91 drivingly engaging a pulley 92 nonrotatably secured to the right-hand end of the shaft 93 of accelerator roll 42. As shown in FIG. 6, a chain 96 engages a sprocket 97 on accelerator roll shaft 93 which also engages a sprocket 98 secured to a shaft 99 of accelerator roll 41. An idler sprocket 101 is rotatably mounted on an adjustable support 102 for purposes of obtaining proper tension of the chain 96. The accelerator rolls 41, 42 are rotated in a directon to cause the threshed material exiting the processor 33 to pass between the accelerator rolls 41, 42, the latter being driven at a sufficiently high speed to impart a velocity to the threshed material far in excess of the velocity such material would have if merely falling by gravity. By offsetting the front accelerator roll 41 above that of the rear accelerator roll 42, the threshed material is thrown downwardly and forwardly to the grain pan 49 of the shaker assembly 48. The rearwardly directed layer of air from the transverse fan 44 passes transversely through the accelerated threshed material causing light chaff and crop particles 106 to be blown rearwardly out the discharge opening 46 at the rear of the combine while accelerated clean grain kernels 107 pass downwardly to the grain pan 49.

On reference to FIG. 2, it will be noted that the left-hand wall 112 of the cleaning section is laterally inward from the sidewall 77. Thus, the cleaning section 47 is laterally narrower than the threshing section 33. In other words, a part of the threshing section 33 laterally overhangs the cleaning section 47 and as seen in FIG. 2 it is this overhanging part of te processor housing 63 from which the flight 71 of the distribution auger moves threshed material to the discharge slot 69. It should be understood that the shaker assembly 48 extends laterally slightly less than the distance between the sidewall 112 and the left sidewall 78. The distribution auger 37 is driven by an endless chain, not shown, operatively engaging sprockets 116, 117 secured, respectively, to the auger shaft 72 and a shaft extension coupled to and aligned with the accelerator roll shaft 93. As shown in FIGS. 6 and 8, a part 119 of the cage above the cage discharge opening 60 does not have radial openings and is closed off from the inside of the housing 63 by walls 121, 122 and 123. Wall 123 is a forward extension of the laterally inner vertical sidewall of the discharge chute 55 and the bottom wall 111 of the chute connects to the bottom of the cage opening 60 by a bridging floor 124 which extends laterally between wall 77 and wall 123.

The embodiments of the invention in which an exclusive property or privilege is claimed are defined as follows:

1. In a combine having a header at its front end, a feeder conveyor for conveying harvested crop material from the header upwardly and rearwardly, a processor including a cylindrical foraminous cage and a rotor mounted in said cage in coaxial relation thereto, the combination comprising:

a housing for said processor including front, rear, right and left sidewalls, said cage extending axially between said right and left sidewalls and said rotor being rotatably mounted on said right and left sidewalls on a horizontal transverse axis, a first radial opening adjacent one axial end of said cage forming an entrance by which crop material enters said cage from said feeder conveyor, a second radial opening adjacent the other axial end of said cage forming an exit for crop material from which the grain has been removed by said processor, a concave in said cage at the first radial opening, a cleaning section having a first lateral sidewall substantially aligned with the sidewall of said housing adjacent said first radial opening and a second lateral sidewall spaced laterally inward from the housing sidewall at said second radial opening whereby the cleaning section is of less lateral width than said processor housing and the latter has an overhanging part extending laterally beyond said cleaning section, downwardly sloping portions on said front and rear sidewalls, said sloping portions in said overhanging part of said housing converging downward to an upward facing auger trough and said sloping portion on said rear wall below and rearward of said concave sloping downward and forward to define the rear edge of a laterally extending vertical discharge slot extending substantially across the width of said cleaning section, a pair of front and rear accelerator rolls extending laterally across the width of said cleaning section, said accelerator rolls being disposed below said slot and above said cleaning section, said housing including an upright laterally extending wall extending downwardly from beneath said concave to the front of said front accelerator roll and forming at least a part of a front edge of said slot, and a single distribution auger at the bottom of said housing having opposite ends rotatably supported on said left and right sidewalls on a horizontal transverse axis including a first spiral flight in cooperative relation to said trough and operative upon rotation in a predetermined direction to move threshed material passing through the radial openings of said cage laterally from said overhanging part of said housing to said slot.

2. The combine of claim 1 wherein said distribution auger includes a second spiral flight on its other end which is pitched in the opposite direction to said first flight and extends laterally inward from the other sidewall, said first flight extending laterally inward beyond said trough and over a portion of said slot terminating in axially spaced relation to said second flight.

3. The combine of claim 2 and further comprising removable flight extensions releasably secured to said auger in laterally inward extending relation to said first and second flights.

4. The combine of claim 1 wherein said sloping portions are disposed at an upward incline of at least 40° and said auger trough is a sufficient distance below said cage to permit said sloping portions to connect to said trough and lie in planes substantially tangential to the radially outer periphery of that portion of said auger disposed in said trough.

* * * * *